(12) United States Patent
Lin

(10) Patent No.: US 6,769,322 B2
(45) Date of Patent: Aug. 3, 2004

(54) LIFT FOR SEALING DEVICE

(76) Inventor: Kun Wang Lin, No. 45, Kung Yieh 15th Road. Da-Li Industrial Park, Tai-Ping City, Taichung Hsien (TW)

( * ) Notice: Subject to any disclaimer, the term of this patent is extended or adjusted under 35 U.S.C. 154(b) by 116 days.

(21) Appl. No.: 10/230,695

(22) Filed: Aug. 29, 2002

(65) Prior Publication Data

US 2004/0040396 A1 Mar. 4, 2004

(51) Int. Cl.[7] ............................................. F16H 27/02
(52) U.S. Cl. ..................... 74/89.23; 74/89.26; 187/266; 187/267; 187/413
(58) Field of Search .............................. 474/68, 64, 69, 474/63, 58; 74/89.23, 89.25, 89.27, 89.28, 89.29; 187/266, 267, 413

(56) References Cited

U.S. PATENT DOCUMENTS

| | | | |
|---|---|---|---|
| 1,962,220 A | * 6/1934 | Stukenborg .................. | 187/209 |
| 1,977,484 A | * 10/1934 | Lagerquist et al. ......... | 187/267 |
| 4,604,008 A | * 8/1986 | Bone .......................... | 409/231 |
| 4,846,619 A | * 7/1989 | Crabtree et al. ............ | 414/273 |
| 5,712,458 A | * 1/1998 | McCandless et al. ....... | 187/317 |
| 6,629,583 B2 | * 10/2003 | Valk et al. .................. | 187/391 |
| 2003/0193737 A1 | * 10/2003 | White et al. ................. | 360/92 |

* cited by examiner

Primary Examiner—David Fenstermacher
(74) Attorney, Agent, or Firm—Pro-Techtor Inter-National Services

(57) ABSTRACT

A lifting mechanism for a sealing device comprises a lift including an upper pulley assembly and a lower pulley assembly, the lift being coupled to the sealing device by a thread rod for either lifting or lowering the sealing device; a rope assembly the rope assembly passing the upper pulley assembly; a rope terminal adjacent the sealing device, the rope terminal being coupled to one end of the rope assembly; a power terminal coupled to the other end of the rope assembly; and a connection cable coupled between the power terminal and the rope terminal through the lower pulley assembly. There is no arc formed by the rope assembly during the lifting or lowering of the sealing device, thereby causing no interference to an operation of the sealing device.

3 Claims, 6 Drawing Sheets

LIFT FOR SEALING DEVICE

FIELD OF THE INVENTION

The present invention relates to sealing devices and more particularly to an improved lift which causes no interference to a normal operation of the sealing device.

BACKGROUND OF THE INVENTION

A conventional sealing device 2 is shown in FIGS. 1 and 2. The sealing device 2 comprises a rope terminal 1 adjacent the sealing device 2, a rope assembly 3 having one end coupled to the rope terminal 1, a drive source 4 mounted on a base, the drive source 4 being coupled to the other end of the rope assembly 3, and a lift 5 also mounted on the base. It is seen that a section of the rope assembly 3 between the rope terminal 1 and the drive source 4 is free. Hence, the rope assembly 3 may be shaped as an arc in its middle section after the sealing device 2 has been lowered by the lift 5. This can interfere a normal operation of the sealing device 2 or even cause danger. Thus improvement exists.

SUMMARY OF THE INVENTION

It is therefore an object of the present invention to provide a lifting mechanism for a sealing device comprising a lift including an upper pulley assembly and a lower pulley assembly, the lift being coupled to the sealing device by a thread rod for either lifting or lowering the sealing device; a rope assembly including a plurality of parallel ropes, the rope assembly passing the upper pulley assembly; a rope terminal adjacent the sealing device, the rope terminal being coupled to one end of the rope assembly; a power terminal coupled to the other end of the rope assembly; and a connection cable coupled between the power terminal and the rope terminal through the lower pulley assembly; wherein there is no arc formed by the ropes of the rope assembly during the lifting or the lowering of the sealing device, thereby causing no interference to an operation of the sealing device.

In one aspect of the present invention, the upper pulley assembly comprises a support and at least one roller with the rope assembly passed through.

In another aspect of the present invention, the lower pulley assembly comprises a support and at least one roller with the connection cable passed through.

The above and other objects, features and advantages of the present invention will become apparent from the following detailed description taken with the accompanying drawings.

DETAILED DESCRIPTION OF THE PREFERRED EMBODIMENTS

Figure 1:
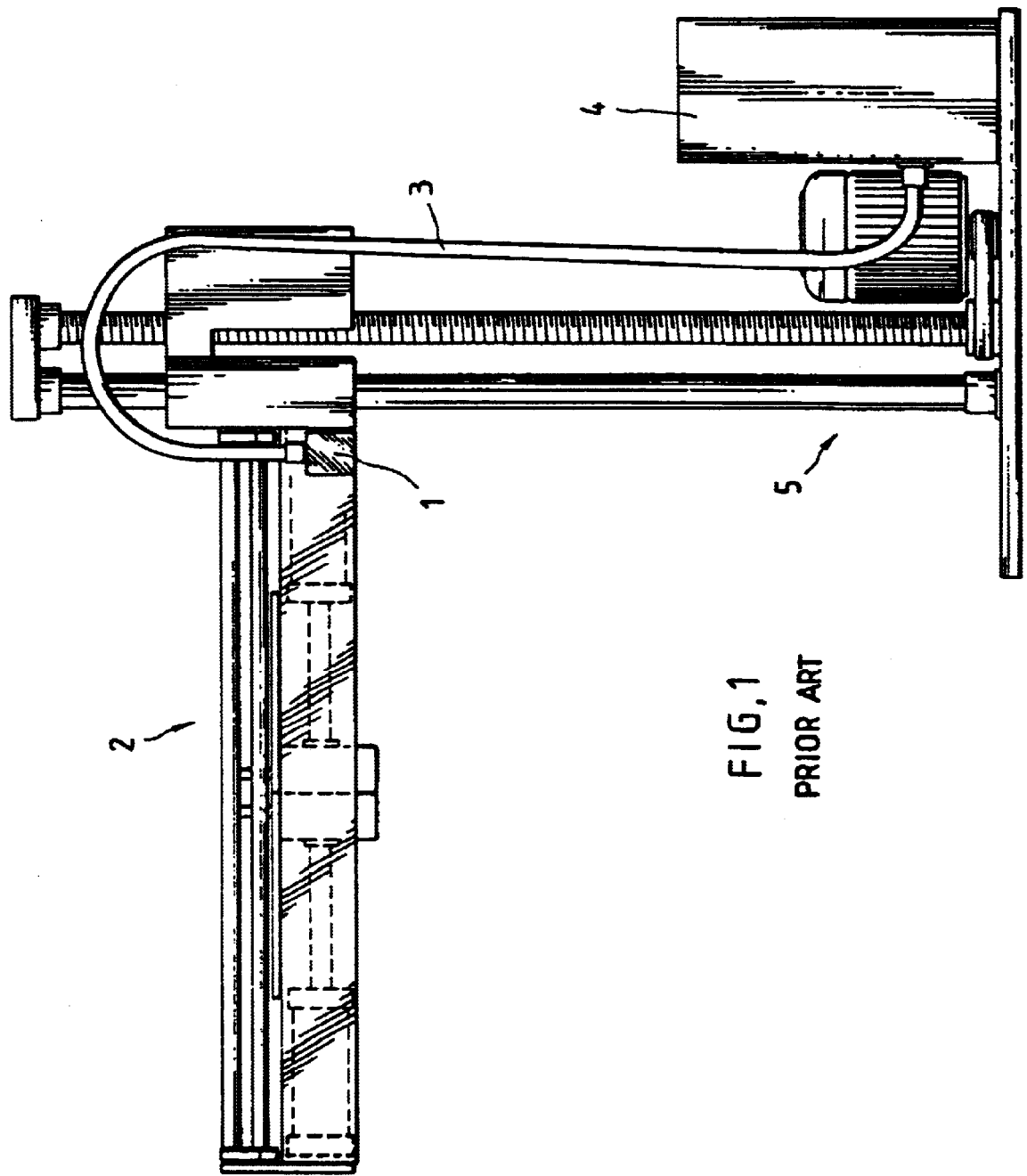
FIG. 1 is a side view of a conventional sealing device incorporating a lift.
Figure 2:
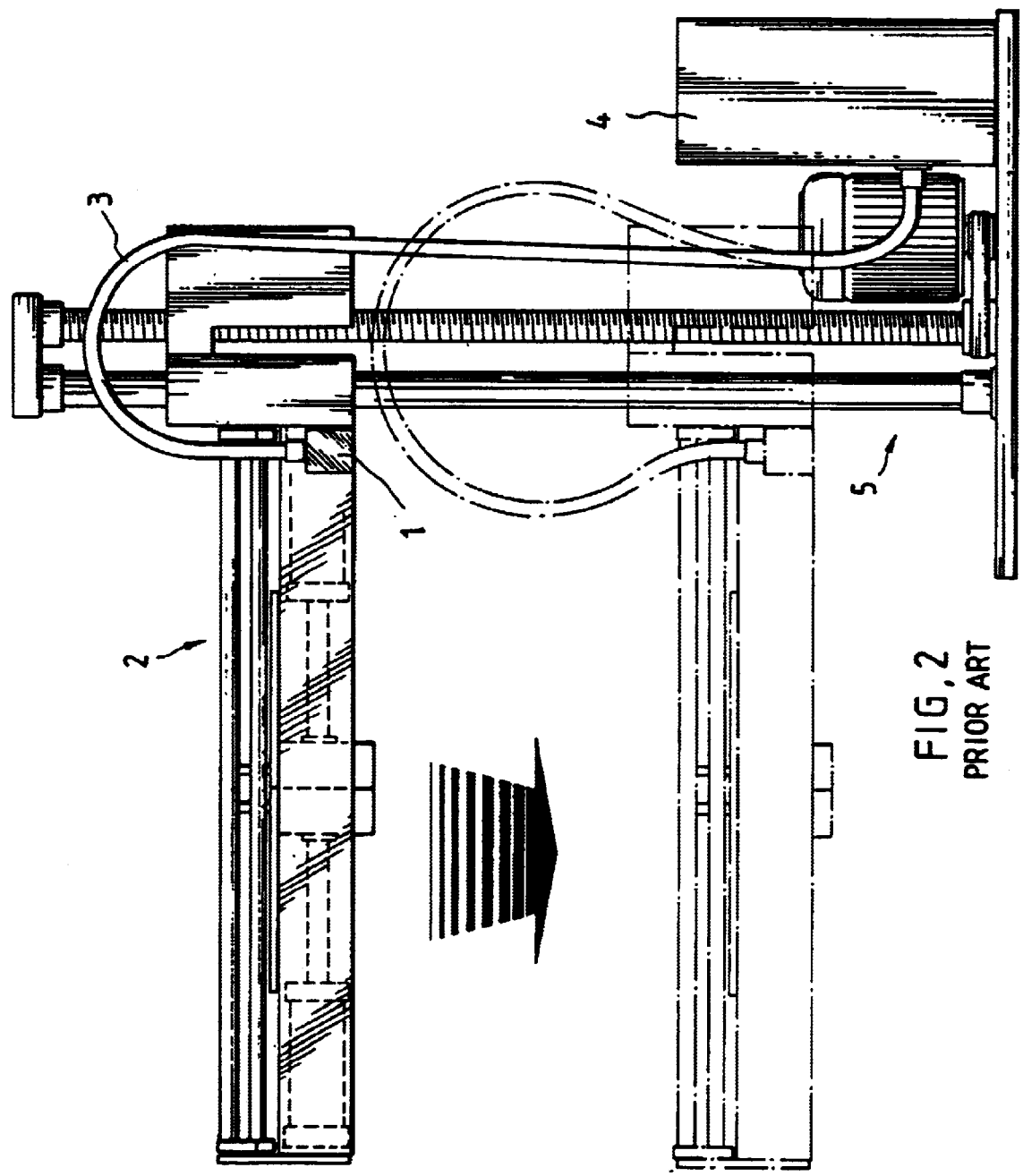
FIG. 2 is a view similar to FIG. 1 showing a lowering operation of the sealing device.
Figure 3:
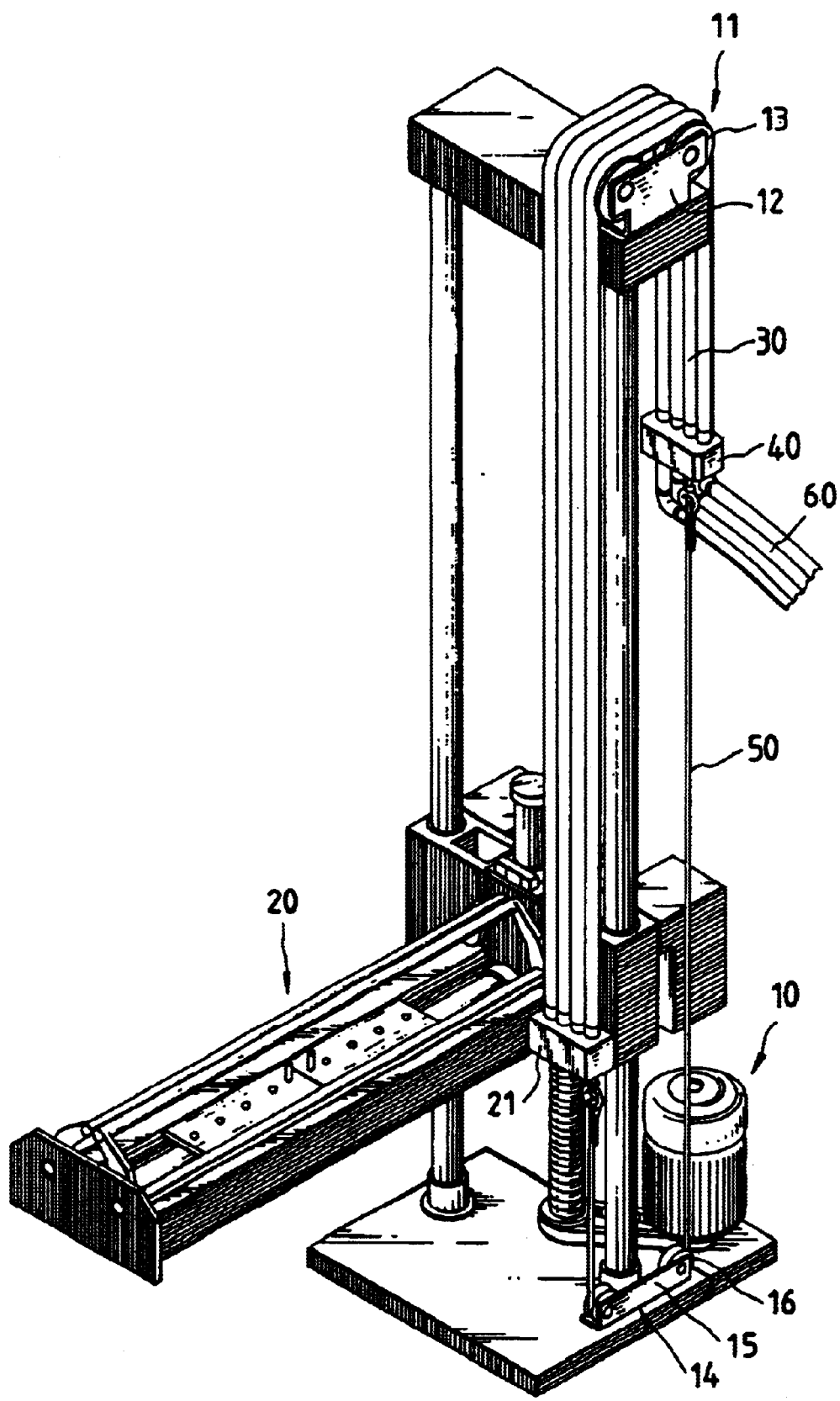
FIG. 3 is a perspective view of a preferred embodiment of a sealing device incorporating a lift according to the invention.
Figure 4:
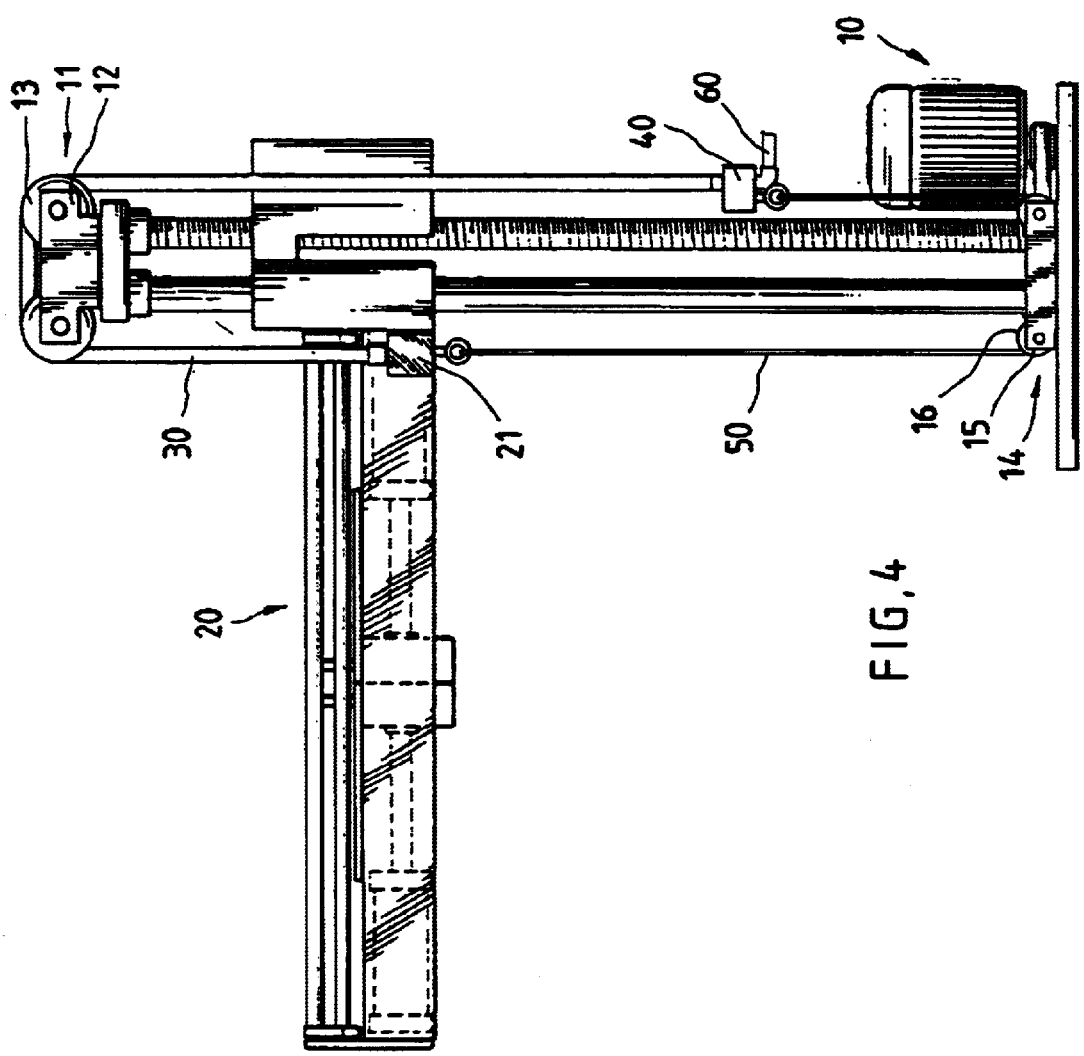
FIG. 4 is a side view of the FIG. 3 sealing device.
Figure 5:
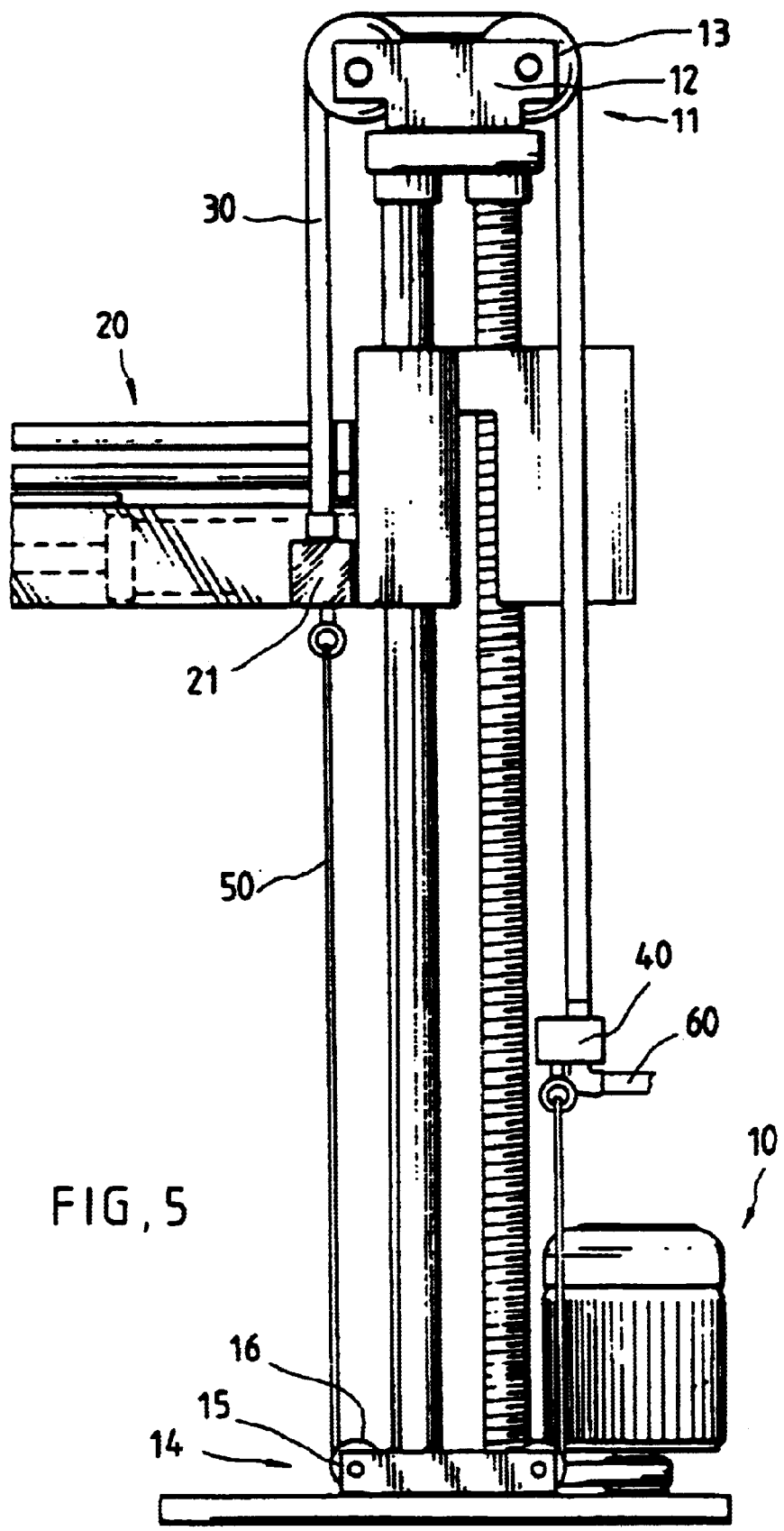
FIG. 5 is an enlarged view of a portion of the FIG. 4 sealing device.

Referring to FIGS. 3, 4, and 5, there is shown a lift 10 for sealing device 20 in accordance with the invention. The lift 10 comprises an upper pulley assembly 11 having a support 12 and a pair of rollers 13, and a lower pulley assembly 14 having a support 15 and a pair of rollers 16. A rope terminal 21 is adjacent the sealing device 20. The rope terminal 21 is coupled to one end of a rope assembly 30 including a plurality of parallel ropes. A power terminal 40 is coupled to the other end of the rope assembly 30. A connection cable 50 is coupled between the power terminal 40 and the rope terminal 21 through the rollers 16 of the lower pulley assembly 14. A hose 60 is extended downward from the power terminal 40. The rope assembly 30 passes the rollers 13 of the upper pulley assembly 11.

Figure 6:
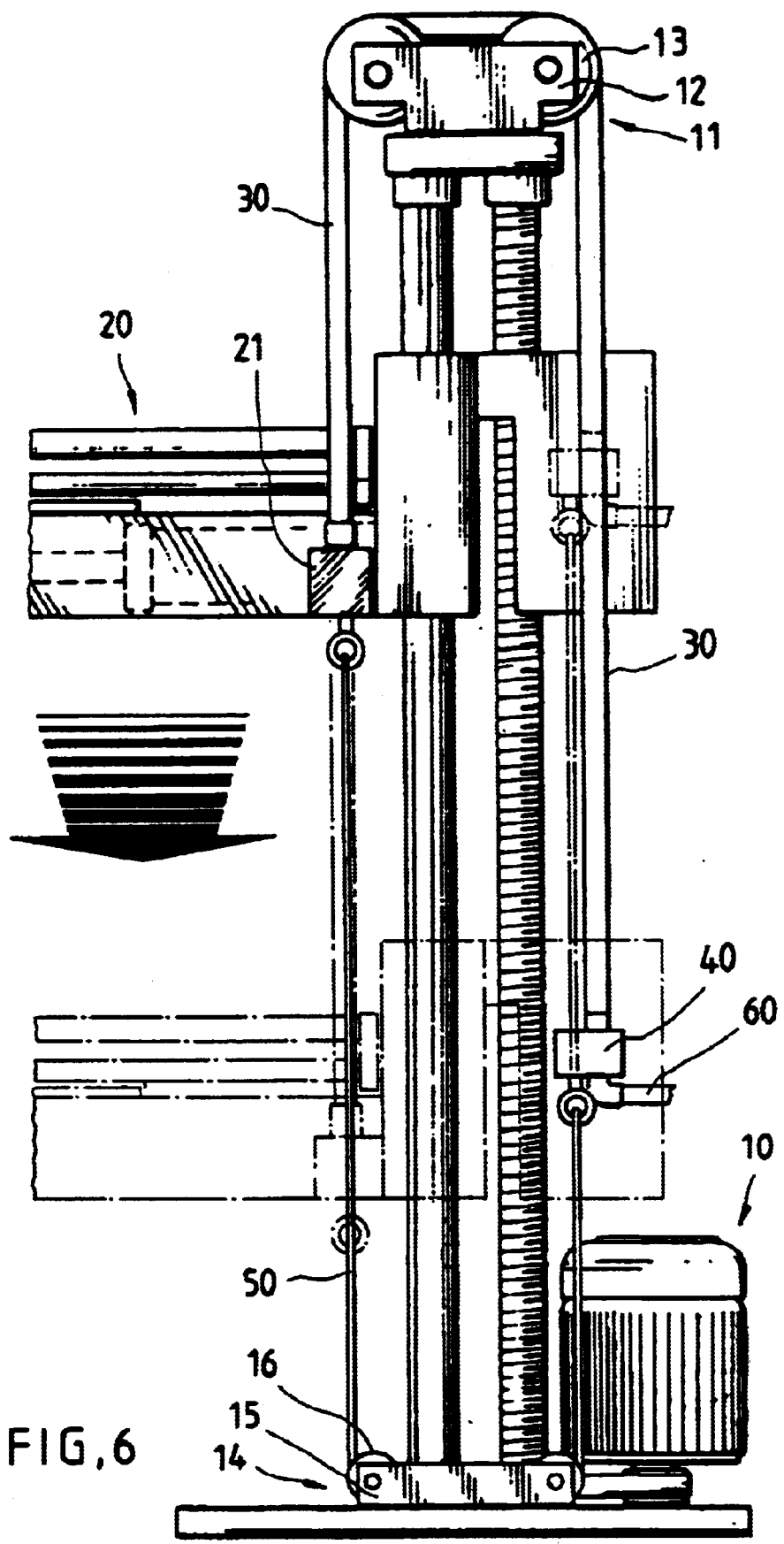
FIG. 6 is a view similar to FIG. 5 showing a lowering operation of the sealing device.

Referring to FIG. 6, an operation of the invention will now be described in detail below. The lift 10 is first driven by a motor. In response, the sealing device 20 coupled to the lift 10 by a thread rod is lowered or lifted. It is seen that no arc is formed by the ropes of the rope assembly 30. Instead, a loop is formed by the rope assembly 30 and the connection cable 50 as supported by the pulley assemblies 11 and 14. This can ensure a normal, safe operation of the sealing device 20. Also, the invention can facilitate maintenance.

While the invention has been described by means of specific embodiments, numerous modifications and variations could be made thereto by those skilled in the art without departing from the scope and spirit of the invention set forth in the claims.

What is claimed is:

1. A lifting mechanism for a sealing device comprising:

a lift including an upper pulley assembly and a lower pulley assembly, the lift being coupled to the sealing device by a thread rod for either lifting or lowering the sealing device;

a rope assembly including a plurality of parallel ropes, the rope assembly passing the upper pulley assembly;

a rope terminal adjacent the sealing device, the rope terminal being coupled to one end of the rope assembly;

a power terminal coupled to the other end of the rope assembly; and a connection cable coupled between the power terminal and the rope terminal through the lower pulley assembly;

wherein there is no arc formed by the ropes of the rope assembly during the lifting or the lowering of the sealing device, thereby causing no interference to an operation of the sealing device.

2. The lift mechanism of claim 1, wherein the upper pulley assembly comprises a support and at least one roller with the rope assembly passed through.

3. The lift mechanism of claim 1, wherein the lower pulley assembly comprises a support and at least one roller with the connection cable passed through.

* * * * *